Patented Jan. 10, 1928.

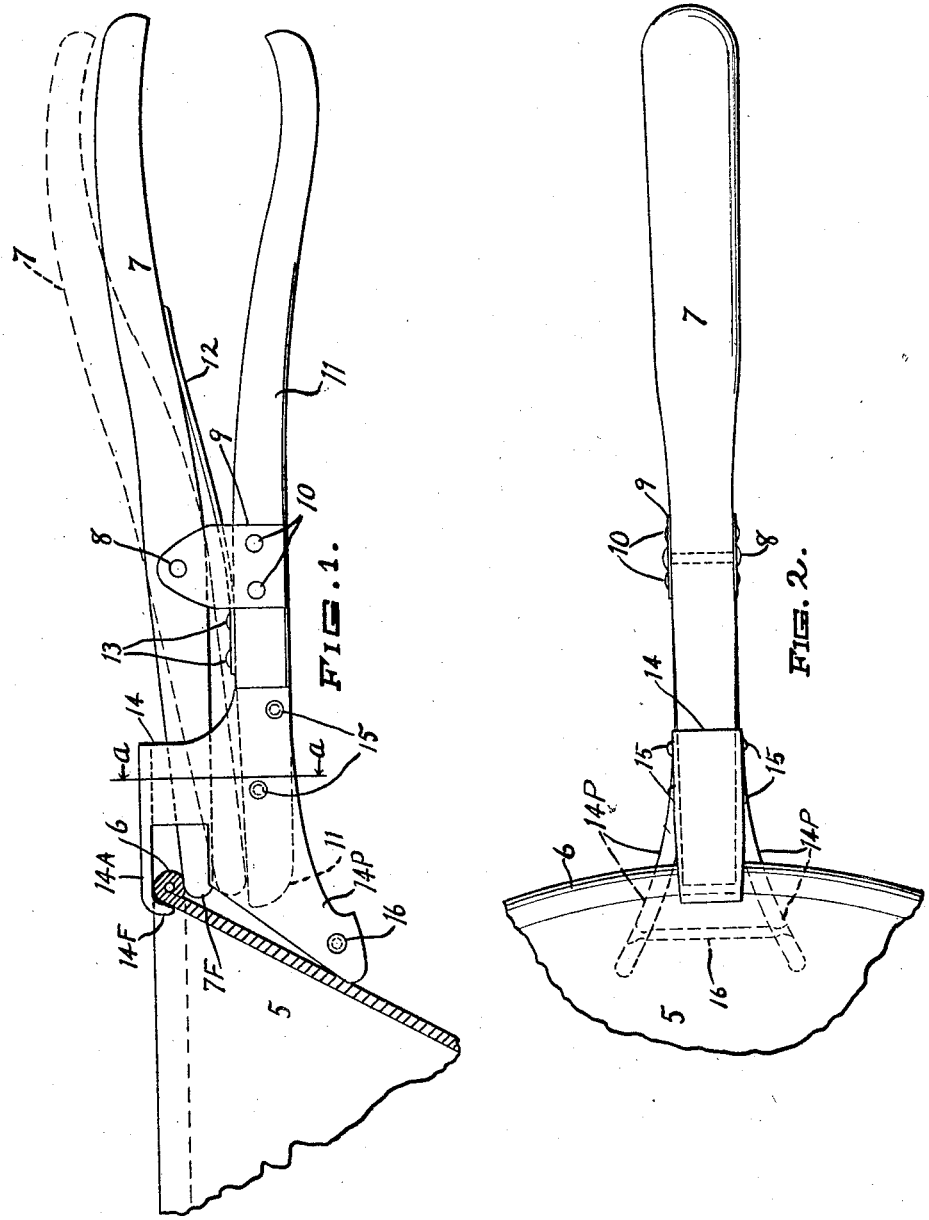

1,655,605

UNITED STATES PATENT OFFICE.

OLOF HOLM, OF ST. PAUL, MINNESOTA.

LIFTING TOOL FOR KITCHEN UTENSILS.

Application filed March 21, 1927. Serial No. 176,954.

This invention relates to a device for handling kitchen utensils such as pie tins, pans, and other articles of the kind having an upper beaded or flanged edge and the object is to provide a simple, inexpensive and highly efficient tool particularly useful for handling pans and the like which are in an oven or otherwise too hot or inconvenient to handle with the hands.

In the accompanying drawing:

Fig. 1 is a side elevation of my improved device in operative position grasping the beaded edge and adjacent parts of a sheet metal kitchen utensil, the latter being shown in cross section.

Fig. 2 is a top view of Fig. 1.

Referring to the drawing by reference numerals, 5 designates a portion of the upper perimetral edge of a metallic kitchen utensil such as a pie tin, a pan or like container used in cooking, said utensil shown with a beaded or flanged perimeter 6.

My improved device resembles a pair of pliers in general appearance, but the lever members are not crossed. 7 is an upper handle lever pivoted at 8 between two upright ears or pivot members 9, fixed at 10 to a lower lever member 11. Both said handles or levers spread from each other rearwardly of pivot 8 in a manner similar to the spreading of plier handles. Forward of the pivot 8 lever 7 is tapered forwardly.

12 represents any suitable type of spreading means for spreading the handle ends apart and as shown as a flat spring fixed at 13 to the lower handle member and bearing upwardly and slidably against the lower side of the upper handle to normally spread the latter to the position shown in dotted lines in Fig. 1. In this latter position, the forward end of the upper lever contacts with the upper side of the front end 11$^F$ of the lower lever, as shown.

14 is a combination jaw and cheek plate member of sheet metal and of inverted U-shape in cross section, as at line $a$—$a$ in Fig. 1. The rear and lower part of the cheeks of said jaw member are suitably fixed as with rivets 15 to the forward part 11$^F$ of lever 11, the top of said jaw member comprising a forwardly directed arm 14$^A$, terminating in a downwardly directed finger 14$^F$, while the front and lower parts of the opposite cheeks are formed in the shape of two forwardly and downwardly directed prongs 14$^P$ gradually spread from each other to their tips, said tips being fixed in spaced relation by a transverse spacer pin 16.

The forward end of lever 7, designated as 7$^F$, is so located that when the rear lever arms are squeezed toward each other, said end or tip 7$^F$ is sprung upwardly toward and into the curvature of finger 14$^F$, but it will be readily understood that said tip 7$^F$ is normally sprung downwardly against the front arm 11$^F$ of lever 11 and just rearward of the front line of the prongs 14$^P$.

In the use of my device, the tool is extended radially toward the edge of a cooking utensil 10, the finger 14$^F$ engaged with the surface of the utensil adjacent to the bead 6 and interiorly of it and at the same time the tips of the lower fingers 14$^P$ permitted to simultaneously engage the outer surface of the utensil below the bead 6 thus making a three point contact, this being done when the handles 7 and 11 are loosely held by the hand without pressing said handles toward each other. After said three point contact has been attained, the operator merely squeezes the handles toward each other, causing the front end 7$^F$ of lever 7 to be sprung upwardly against and securely engage the underside of bead 6 as shown in full lines in Fig. 1. Thus there is a firm grip on the utensil which is maintained as long as the operator has a good grip on the handles 7 and 11 and any pie tin, cake tin or the like, may be taken out of an oven, off of a stove and transferred from one place to another without the hands of the operator actually coming into contact with a heated surface.

I claim:

1. A utensil handle comprising two hand levers, one pivotally mounted in fixed spaced relation to the other, and both in a common plane, the parts of said handles rearward of said pivot comprising the hand hold members, a spring fixed in one member and slidably engaging the other member to normally hold said hand hold parts spread, with the front end of the upper member against the adjacent front end of the lower member, an elongated metal yoke fixed on the forward end of the lower member, and straddling the front end of the upper handle member, a longitudinal finger on the upper part of said yoke extending forward and having a downwardly curved extremity adapted to be engaged over the perimetral beaded edge of a kitchen utensil, and said front end of the upper handle adapted to be swung upwardly to simultaneously engage the lower and outer parts of said beaded edge when the hand hold members are pressed toward each other, and means formed of the lower part of said yoke for engaging the kitchen utensil below said beaded edge.

2. The structure specified in claim 1, in which said latter means of the yoke comprises two forwardly and downwardly directed, transversely spaced prongs spread apart to their extremities and means holding said latter tips in spread relation.

3. The structure specified in claim 1, in which said latter means of the yoke comprises two forwardly and downwardly directed, transversely spaced prongs spread apart to their extremities and means holding said latter tips in spread relation consisting of a transverse spacer rod fixed to and between said prongs.

In testimony whereof I affix my signature.

OLOF HOLM.